United States Patent [19]

Mihara

[11] Patent Number: 4,666,599
[45] Date of Patent: May 19, 1987

[54] WATER PURIFICATION DEVICE

[76] Inventor: Osamu Mihara, 7-15, Kugenuma Kaigan 3-Chome, Fujisawa-Shi, Kanagawa-Ken, Japan

[21] Appl. No.: 903,567
[22] PCT Filed: Dec. 26, 1985
[86] PCT No.: PCT/JP85/00716
§ 371 Date: Aug. 15, 1986
§ 102(e) Date: Aug. 15, 1986
[87] PCT Pub. No.: WO86/04050
PCT Pub. Date: Jul. 17, 1986

[30] Foreign Application Priority Data

Dec. 27, 1984 [JP] Japan .................. 59-275193

[51] Int. Cl.⁴ .............. B01D 17/06; B01J 20/30; C02F 1/28; C02F 1/46
[52] U.S. Cl. ............................ 210/243; 204/302
[58] Field of Search ............... 204/186, 302; 210/243, 210/748

[56] References Cited

U.S. PATENT DOCUMENTS 3,252,885  5/1966  Griswold ................. 210/243
3,484,362 12/1969  Van Vroonhoven ...... 204/186
3,933,643  1/1976  Colvin et al. ............. 210/243
4,350,590  9/1982  Robinson ................. 210/243
4,372,837  2/1983  Watson et al. ............ 204/302

Primary Examiner—Ivars Cintins
Attorney, Agent, or Firm—Koda and Androlia

[57] ABSTRACT

A water purification device in which a plurality of purification units, each having a sheet of extended activated charcoal cloth, are stacked in a multiple-tier form and the water to be treated is made to pass through the purification units, whereby the water is purified. A plurality of purification units, each having a sheet of extended activated charcoal cloth, are stacked in a form of a multiple-tier form, and are spaced apart from each other by a specific distance in a purification chamber defined in a purification tank having an inlet and an outlet. A rotating shaft is rotatably supported to extend through the centers of the purification units, and electrode rods supported as cantilevers by the rotating shaft. Sparks are produced between the electrode rods and the sheets of activated charcoal cloth so that adsorbed substances are removed. The water purification device is used to purify municipal water for industrial or household use.

2 Claims, 3 Drawing Figures

U.S. Patent   May 19, 1987   4,666,599
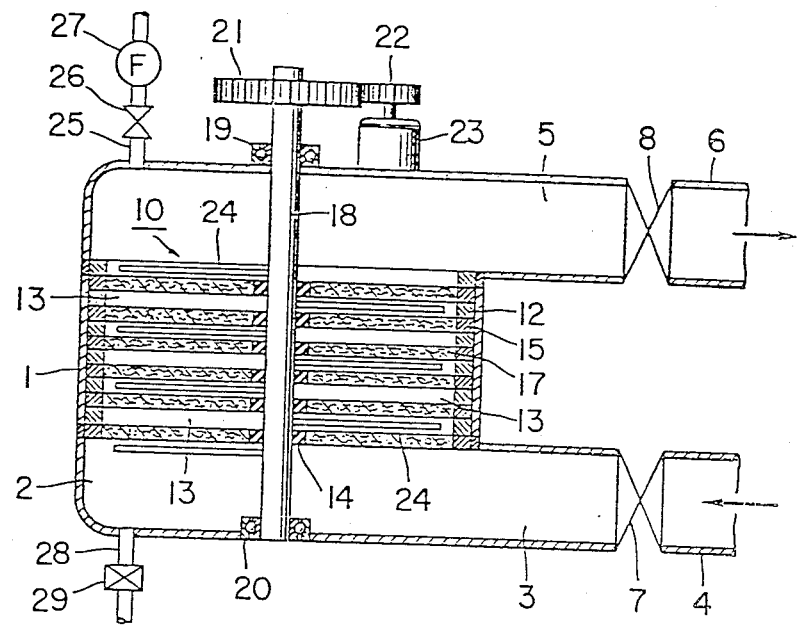
FIG. 1
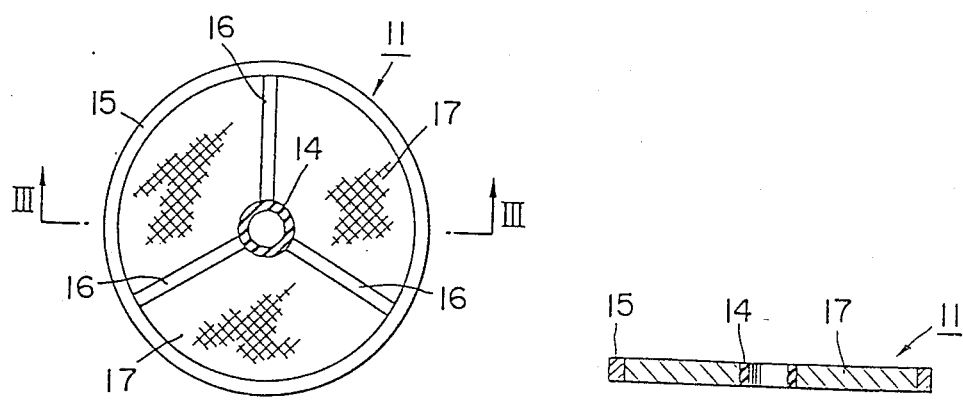
FIG. 2
FIG. 3

WATER PURIFICATION DEVICE

TECHNICAL FIELD

The present invention relates to a water purification device and more particularly to a water purification device of the type in which a plurality of disk-shaped purification units each having an extended sheet of activated charcoal cloth are stacked, and electrode rods are rotated between the purification units so that sparks are produced between the electrode rods and the sheets of activated charcoal cloth, thereby regenerating the sheets of activated charcoal cloth.

BACKGROUND ART

In general, in the case of the supply of municipal water to high-rise buildings and collective residences, municipal water which has been disinfected by chlorine is introduced from a source of water supply into a water storage tank disposed in the ground under a building, and the water in the water storage tank is lifted by a pump to a distribution tank installed on the roof of the building and is distributed through a water distribution system to individual users. The water in the water storage tank is frequently contaminated by various bacteria and microorganisms, and sanitation problem occurs when the water from the water storage tank which is not treated is used as potable water. Chlorine is effective for killing various bacteria and microorganisms contained in the stored water, but it combines with ammonia, producing trihalomethane. Since trihalomethane is a compound causing cancer, the necessity for purifying municipal water before it is used as potable or drinkable water has been increasing recently. Such contaminated municipal water is made to pass through activated charcoal particles or lumps so that contaminants are adsorbed and removed by activated charcoal. In general, since activated charcoal has high adsorbability, it is desirable as a treating agent, but when its adsorptivity is almost saturated, its adsorbability is decreased so that thereafter it does not exhibit capability as a treating agent. Activated charcoal whose adsorptivity has been once decreased as described above cannot be used again unless the activated charcoal is subjected to a regeneration or reactivation treatment for removing adsorbed substances. For this reason, a purification device utilizing activated charcoal has the problem of high running cost, that is, high regenerating cost. In the case of multistory residences or building, the quantity of water to be treated is large so that the quantity of activated charcoal to be used is also large. Consequently, there arises a problem in that when the activated charcoal is packed into a large-sized purification vessel, it is difficult to regenerate the activated charcoal because the gases resulting from the regenerating treatment cannot be completely discharged out of the purification vessel. In addition, there is the problem, when activated charcoal particles are used, of the device inevitably becoming large in size so that a large installation space must be provided.

In view of the above, an object of the present invention is to provide a water purification device which removes adsorbed substances from the surfaces of a large quantity of sheets of activated charcoal cloth whose adsorbing capability has decreased because of the adhesion of the adsorbed substances to the surfaces of the sheets of activated charcoal cloth so that the sheets of activated charcoal cloth can be regenerated and reactivated and that the device can be made compact in size.

DISCLOSURE OF THE INVENTION

A water purification device in accordance with the present invention comprises a purification tank which has an inlet and an outlet and which defines therein a purification chamber; a plurality of purification units which are disposed one upon another in a multiple-tier form in the purification chamber in the purification tank and spaced apart from each other by a specific distance, and in each of which a sheet of an activated charcoal cloth is extended over the entire cross sectional area of the water passage; a rotating shaft rotatably extended through the centers of the purification units; and electrode rods whose inner ends are fixedly supported by the rotating shaft, and which are rotatable between adjacent purification units.

The purification unit in accordance with the present invention has an inner ring and an outer ring which are disposed in coaxial relationship with each other and are interconnected with each other by a plurality of supporting blades. A sheet of activated charcoal cloth is extended in and over an annular space defined between the inner and outer rings. According to the present invention, a plurality of disk-shaped purification units, each having a sheet of extended activated charcoal cloth, are stacked so that the purification device can be made compact in size as a whole. A space is defined between the purification units each having a sheet of extended activated charcoal cloth, and an electrode rod is rotated in the space thus defined so that an electrical discharge phenomenon is produced between the electrode rod and the sheet of activated charcoal cloth of each unit, thereby regenerating and reactivating the cloth and removing substances adsorbed by the surfaces of the sheets of activated charcoal cloth while the purification units remain assembled.

BRIEF DESCRIPTION OF THE DRAWINGS

FIG. 1 is a longitudinal sectional view of an example of practice of a water purification device in accordance with the present invention;

FIG. 2 is a plan view of a purification unit; and

FIG. 3 is a longitudinal sectional view thereof.

BEST MODE FOR CARRYING OUT THE INVENTION

The present invention will be described in detail with reference to the accompanying drawings.

In FIG. 1, reference numeral 1 designates a purification tank, in which is defined a purification chamber 2. An inlet 3 of the purification chamber 2 is joined to an inlet pipe 4 while an outlet 5 thereof is joined to an outlet pipe 6 so that the water to be purified flows through the inlet 3 into the purification chamber 2, while the purified water is discharged through the outlet 5. An inlet valve 7 is inserted into the inlet pipe 4 while an outlet valve 8 is inserted into the outlet pipe 6. It is preferable that the inlet and outlet valves 7 and 8 be solenoid controlled valves.

A purification device indicated generally by the reference numeral 10 is installed in the purification chamber 2 of the purification tank 1. The purification device 10 comprises a plurality of disk-shaped purification units 11 which are vertically stacked with spacers 12 interposed between the adjacent purification units 11. A space 13 is defined between the adjacent purification units 11.

As shown in FIGS. 2 and 3, each purification unit 11 comprises an inner ring 14 and an outer ring 15 which are disposed in coaxial relationship with each other and interconnected by three supporting blades 16. It is preferable that the inner ring 14 be made of a ceramic which is an insulating material, but the outer ring 15 is made of stainless steel. A sheet of activated charcoal cloth 17 is extended between the inner and outer rings 14 and 15. The activated charcoal cloth is well known in the art and may be, for instance, Fine Guard Cloth maufactured and sold by Toho Rayon K.K. Six purification units 11 of the above described construction are stacked, leaving spaces 13 therebetween as shown in FIG. 1.

A rotating shaft 18 is extended through the centers of the purification units 11 and is rotatably supported at its upper and lower ends by an upper bearing 19 and a lower bearing 20 for rotation relative to the purification tank 1. A driven gear 21 is fixed to the upper end of the rotating shaft 18 and is in mesh with a driving gear 22, which in turn is rotated by a driving motor 23. Electrode rods 24 for regenerating and reactivating the sheets of cloth 17 are fixedly supported by the rotating shaft 18. Each of the electrode rods 24 is adapted to rotate in a respective space 13, leaving a small gap between the electrode rod 24 and the activated charcoal cloth 17. A discharge voltage is applied through the rotating shaft 18 between the electrode rod 24 and the sheet of activated charcoal cloth 17. In this example, the rotating shaft 18 is connected to the positive terminal while the purification units 11 are connected to the negative terminal.

The electrode rods 24 may be fixed to the rotating shaft 18 in such a way that they are aligned with each other or that they are out of phase by a suitable angle from each other in the circumferential direction.

In FIG. 1, an exhaust pipe 25 is connected to the upper portion of the purification tank, and a valve 26 and an exhaust blower 27 are installed in the exhaust pipe 25. A drain pipe 28 is connected to the lower portion of the purification tank 1 and a drain discharge valve 29 is installed in the drain pipe 28.

Next the mode of operation of the water purification device of the above-described construction will be described.

Normally, both the inlet and outlet valves 7 and 8 are kept wide opened, and the contaminated municipal water to be purified flows through the inlet pipe 4 and the inlet 3 into the purification chamber 2 and is purified by the purification units 11 so that the water flows upward while the contaminants contained in the municipal water are adsorbed and removed by the sheet of activated charcoal cloth 17. The purified water flows through the outlet valve 8 into the outlet pipe 6.

While the sheet of activated charcoal cloth 17 retain their adsorbing capability, they remove the contaminants in the contaminated water, thereby purifying the contaminated water, but when the contaminants have been adsorbed in large quantities by the surfaces of the activated charcoal cloth 17, the purifying capability is decreased, so that the sheets of activated charcoal cloth 17 must be regenerated and reactivated.

Next the regenerating and reactivating treatment in accordance with the present invention will be described. In order to carry out this treatment, the inlet and outlet valves 7 and 8 are fully closed, while the drain discharge valve 29 is opened, so that the water remaining in the purification chamber 2 is completely drained. Thereafter, a discharge voltage is applied between the electrode rods 24 and the sheets of activated charcoal cloth 17 while the driving motor 23 is driven at a low speed, so that the driving gear 22 rotates the driven gear 21, and consequently the electrode rods 24 are caused to rotated while leaving a small gap between each electrode rod 24 and the adjacent sheet of activated charcoal cloth 17. Then spark discharges are produced between the electrode rods 24 and the sheets of activated charcoal cloth 17, whereby the adsorbed substances adsorbed on the surfaces of the sheets of activated charcoal cloth are easily separated. During the regenerating the reactivation treatment, gases including water vapor are produced so that the exhaust valve 26 must be opened, thereby discharging the gases by means of the exhaust blower 27 into the surrounding atmosphere.

INDUSTRIAL APPLICABILITY

The water purification device in accordance with the present invention is applicable for use in purifying industrial and household municipal water, in obtaining purified water for use in the fabrication of semiconductors and for water vessels for cultivation of young of fishes.

I claim:
1. A water purification device comprising:
    a purification tank which has an inlet and an outlet and which defines therein a purification chamber;
    a plurality of purification units which are stacked in a multiple-tier form in said purification chamber of said purification tank and are spaced apart from each other by a specific distance, and each of which has a sheet of activated charcoal cloth extended over the entire cross section of a water passage;
    a rotating shaft rotatably insrtalled through the centers of said purification units; and
    electrode rods whose inner ends are fixedly supported by said rotating shaft, and which are rotatable between adjacent purification units.
2. A water purification device as set forth in claim 1 characterized in that each of said purification units has an inner ring and an outer ring which are disposed in coaxial relationship with each other and which are interconnected by a plurality of supporting blades and a sheet of activated charcoal cloth is extended over the annular space defined between said inner and outer rings.

* * * * *